(12) United States Patent
Tsai et al.

(10) Patent No.: US 9,183,139 B2
(45) Date of Patent: Nov. 10, 2015

(54) MAINBOARD AND METHOD OF BACKING UP OF BASEBOARD MANAGEMENT CONTROLLER

(71) Applicant: HON HAI PRECISION INDUSTRY CO., LTD., New Taipei (TW)

(72) Inventors: Cheng-Yen Tsai, New Taipei (TW); Chih-Yuan Huang, New Taipei (TW); Chien-Pan Lai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 84 days.

(21) Appl. No.: 14/150,715

(22) Filed: Jan. 8, 2014

(65) Prior Publication Data

US 2014/0215134 A1 Jul. 31, 2014

(30) Foreign Application Priority Data

Jan. 31, 2013 (TW) .............................. 102103640 U (51) Int. Cl.
*G06F 12/16* (2006.01)
*G06F 12/02* (2006.01)
*G06F 11/14* (2006.01)
*G06F 11/16* (2006.01)

(52) U.S. Cl.
CPC ........ *G06F 12/0246* (2013.01); *G06F 11/1448* (2013.01); *G06F 11/1456* (2013.01); *G06F 11/1461* (2013.01); *G06F 11/1666* (2013.01)

(58) Field of Classification Search
CPC ............ G06F 12/1456; G06F 12/1461; G06F 12/1448; G06F 12/1666
USPC .................................................. 711/103, 162
See application file for complete search history.

(56) References Cited

U.S. PATENT DOCUMENTS

| 2002/0065999 | A1 | 5/2002 | Kikuchi et al. |
| 2010/0115004 | A1 | 5/2010 | Liao et al. |
| 2010/0125752 | A1* | 5/2010 | Chen et al. ......................... 714/6 |
| 2012/0110378 | A1* | 5/2012 | Fan et al. ......................... 714/15 |
| 2013/0205129 | A1* | 8/2013 | Peng .................................. 713/2 |
| 2013/0339780 | A1* | 12/2013 | Lin .................................. 714/2 |

* cited by examiner

*Primary Examiner* — Than Nguyen
(74) *Attorney, Agent, or Firm* — Novak Druce Connolly Bove + Quigg LLP (57) ABSTRACT

A mainboard includes a selecting module, a calculating module, and a backup module. The selecting module selects a highest backup sequence group. The calculating module checks whether current backup time arrives, and calculates memory space of partitions belonging to the highest backup sequence group when the current backup time arrives. The backup module checks whether residual space in a first flash is enough according to the calculated memory space, and backs up the partitions belonging to the highest backup sequence group originally in a second flash to the first flash if the residual space in the first flash is enough. A method of the mainboard backing up of a baseboard management controller is also provided, which provides backing up for the baseboard management controller.

15 Claims, 6 Drawing Sheets

FIG. 1

| | Backup parameter | Repair parameter | | |
|---|---|---|---|---|
| Partition | Backup Group | BMC address (autogeneration) | backup address (autogeneration) | CRC (autogeneration) |
| Boot Loader | Group 1 | (0x1000~1500) | (0x2000~2500) | (0xBB3D) |
| Private Storage | Group 2 | (0x2000~3000) | (0x3000~4000) | (0xF0E2) |
| Kernel | Group 3 | (0x5000~7000) | (0x6000~8000) | (0xE3CA) |
| File System | Group 3 | (0x8000~15000) | (0x9000~16000) | (0xD70E) |
| Other partition | N/A | N/A | N/A | N/A |

The top of the backup table

| Backup Group | Whether have backed up | Backup sequence | Backup cycle |
|---|---|---|---|
| Group 1 | Yes | 1st | 180 days |
| Group 2 | Yes | 2nd | 7 days |
| Group 3 | No | N/A | N/A |

The lower of the backup table

MAINBOARD AND METHOD OF BACKING UP OF BASEBOARD MANAGEMENT CONTROLLER

BACKGROUND

1. Technical Field

The disclosure relates to a mainboard, and particularly to a method of the mainboard backing up a baseboard management controller.

2. Description of Related Art

A baseboard management controller is responsible for detecting the health of a mainboard. The baseboard management controller automatically backs up for the mainboard when the mainboard is abnormal. However, there is no storage medium on the mainboard for backing up the baseboard management controller. Thus, the baseboard management controller will be unable to normally boot if a flash of the baseboard management controller is bad, and also can not detect the health of the mainboard. Therefore, a mainboard and method of backing up of a baseboard management controller is needed to be provided.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Figure 1:
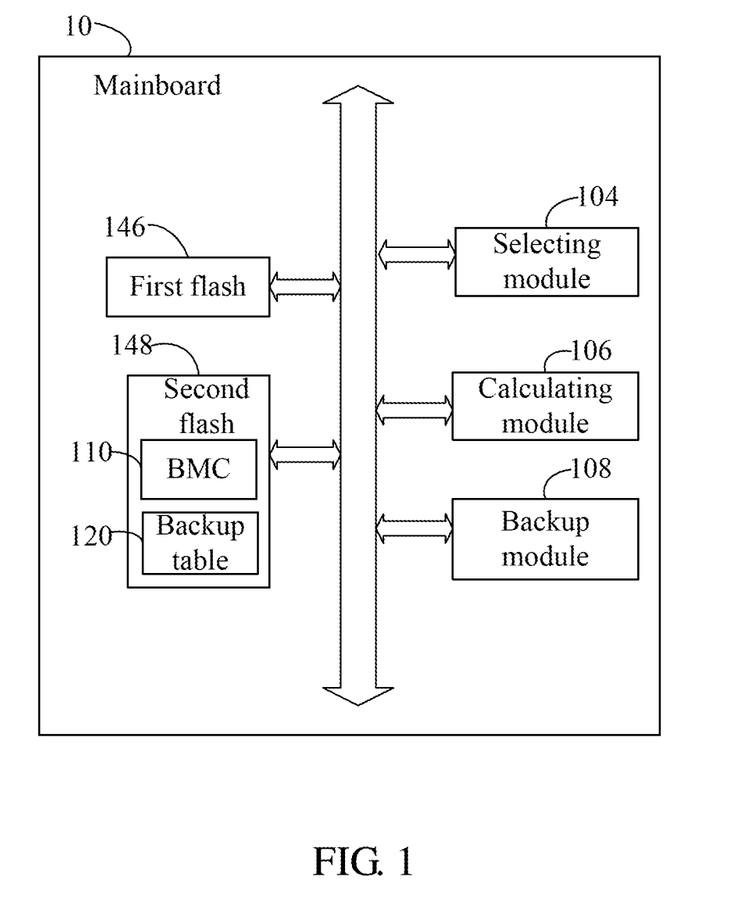
FIG. 1 is a function module diagram of one embodiment of a mainboard.

FIG. 1 is a function module diagram of one embodiment of a mainboard 10. In one embodiment, the mainboard 10 comprises a first flash 146, a second flash 148, a selecting module 104, a calculating module 106, and a backup module 108. The mainboard 10 also comprises a basic input output system (BIOS) and a baseboard management controller (BMC) 110. The BMC 110 is responsible for detecting the health of a mainboard. The BMC 110 is responsible for initial setting and testing when the BMC 110 is booting, to ensure that the mainboard 10 works. In one embodiment, the BIOS is stored in the first flash 146, the BMC 110 is stored in the second flash 148.

In one embodiment, the mainboard 10 backs up the BMC 110 which stored in the second flash 148 to memory space of the first flash 146. The mainboard 10 repairs the BMC 110 stored in the second flash 148 when the BMC 110 stored in the second flash 148 is bad according to the backup BMC 110 stored in the first flash 146. In one embodiment, the first flash 146 is a flash of the BIOS or a memory of a physical database or some existing memory of the mainboard 10. The mainboard 10 provide adequate backup space for the second flash 148 according to the existing first flash 148. At this moment the first flash 146 is the flash of the BIOS.

The second flash 148 stores a backup table 120, the backup table 120 comprises backup parameter and repair parameter. The mainboard 10 backs up the BMC 110 to the first flash 146 according to the backup parameter of the backup table 120. Then, the mainboard 10 repairs data of the first flash 146 to the second flash 148 when the BMC 110 is bad according to the repair parameter of the backup table 120.

Figure 2:
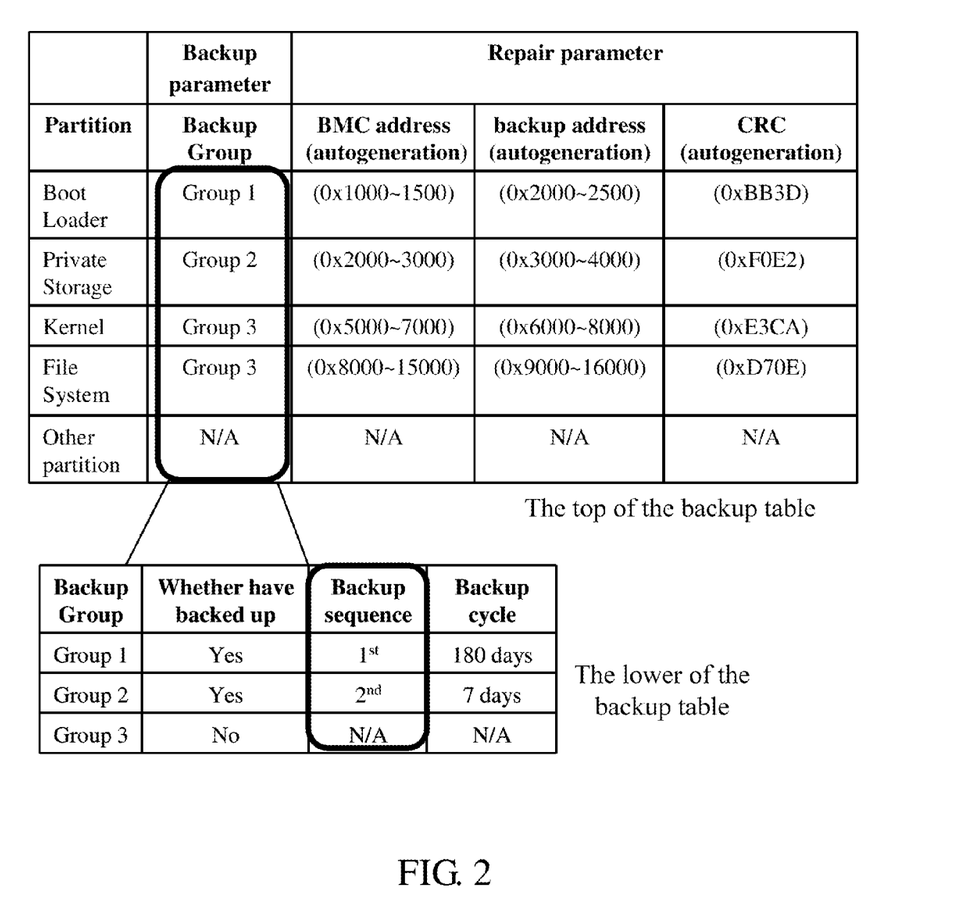
FIG. 2 is a diagram of one example of the backup table of the mainboard of FIG. 1 as disclosed.

In one embodiment, user sets the backup parameter of the backup table 120 according to backup requirement, and then the repair parameter of the backup table 120 is generated by the mainboard 10 after the backup completed FIG. 2 is a diagram of one example of the backup table 120 of the mainboard of FIG. 1 as disclosed. In this embodiment, the backup table comprises a top part and a lower part. The top part (e.g., for names of columns) of the backup table 120 contains information of overall structure comprising partition, backup groups, BMC 110 address, backup address, and cyclic redundancy check (CRC). The lower part (contents) of the backup table 120 contains detailed information on the backup group.

The top part of the backup table 120 of FIG. 2 comprises information of which need to backup the data, backup parameter of each of the partitions, and repair parameter of each of the partitions. In this example, the partitions of the backup table 120 comprises a boot loader, a private storage, a kernel, a file system, and other partition.

The backup parameter of the lower part of the backup table 120 comprises the information of each of the partitions belong to backup groups, the information of whether the partitions have backed up, the information of the backup sequence of the partitions belong to one of the backup groups, the information of a backup cycle of the partitions, and the information of last backup time of the partitions. In one embodiment, in response to the backup sequence of the boot loader is first, one of the partitions stored in the second flash 148 is the boot loader, other partitions where have backed up, the backup sequence of other partitions, and the cycle of backup of other partitions is based on level of importance by user. In one embodiment, the backup sequence of the private storage is second, the backup sequence of the kernel and the file system is third.

The repair parameter of the backup table 120 comprises the BMC 110 address, the backup address, and the CRC, the repair parameter of the backup table 120 is generated by the mainboard 10 after the backup completed, the BMC 110 address is the location of the partitions stored in the second flash 148, the backup address is the location of the partitions backed up in the first flash 146. In this example, the location of the kernel stored in the second flash 148 is (0x5000-7000), the location of the kernel backed up in the first flash 146 is (0x6000-8000), the CRC of the kernel is (0xE3CA). When the backup parameter and the repair parameter have charged, the charged parameter temporarily stores in a memory 140, on the BMC 110 booting the BMC 110 loads the charged parameter to the backup table 120, to replace original parameter, to update the backup table 120.

The top part and the lower part of the backup table 120 just be an example, in practical application the field of the top part and the lower part of the backup table 120 can be amended by actual demand.

The selecting module 104 filters backup groups needed to be backed up from the backup table 120 according to the information whether have backed up, and selects a highest backup sequence group from the backup table 120 according to the information of the backup sequence. The calculating module 106 checks whether current backup time of partitions belonging to the highest backup sequence group arrives according to the information of the backup cycle and the information of the last backup time, and calculates memory space of the partitions belonging to the highest backup sequence group when the current backup time arrives. The backup module 108 checks whether residual space in the first flash 146 is enough according to the calculated memory space, and backs up the partitions belonging to the highest backup sequence group originally in the second flash 148 to the first flash 146 if the residual space in the first flash 146 is enough. The selecting module 104 checks whether still have need backup groups in the backup table 120, and backs up the next backup sequence group if the backup table 120 still have backup groups.

In this example, the backup sequence of group 1 is first, the group 1 comprises the boot loader, the boot loader is the backup group and the backup cycle is 18 days. The calculating module 106 calculates time according to today's date and the last backup time, and checks whether current backup time arrives according to comparing the calculated time with 18 days. The calculating module 106 calculates memory space of the partitions which belong to group 1 in the second flash 148, and checks whether residual space in the first flash 146 is enough to backup the partitions which belong to group 1, the backup module 108 backs up the boot loader stored in the second flash 148 to the first flash 146 when the residual space in the first flash 146 is enough. That is, the backup module 108 begin to backup the private storage after the boot loader have backed up, and stop to backup when the residual space is not enough or all of the partitions have backed up.

Figure 3:
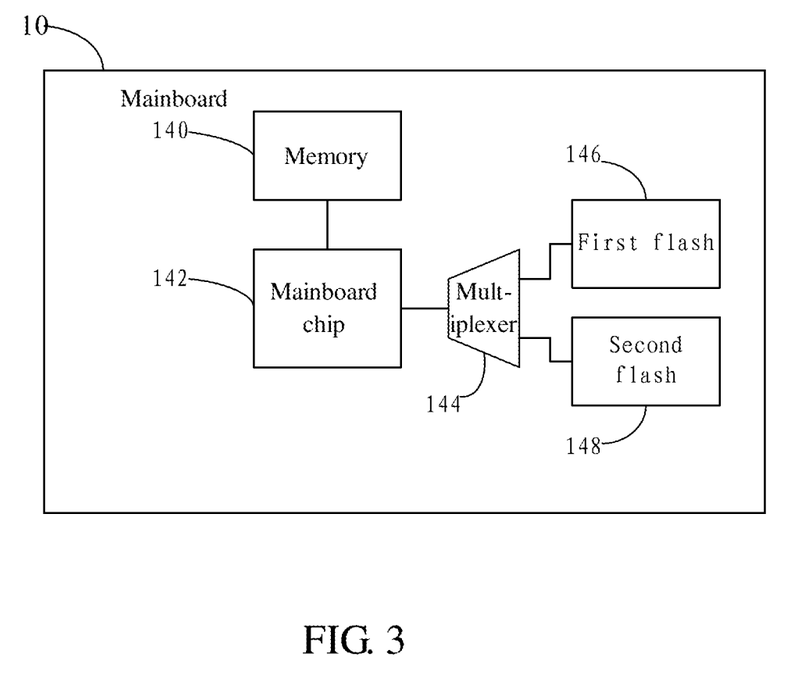
FIG. 3 is a schematic diagram of one embodiment of a mainboard.

FIG. 3 is a schematic diagram of one embodiment of the mainboard 10. The mainboard 10 comprises a memory 140, a multiplexer 144, a mainboard chip 142, the first flash 146, and the second flash 148, the mainboard chip 142 backs up need backup partitions in the second flash 148 to the first flash 146 through the multiplexer 144. In one embodiment, the mainboard chip 142 is a south bridge of the mainboard 10, the multiplexer 144 comprises two input ports and an output port. The two input ports of the multiplexer 144 are connected to the first flash 146 and the second flash 148 respectively, the out port of the multiplexer 144 is connected to the memory 140. The mainboard chip 142 controls the channel conduction between the multiplexer 144 and the second flash 148, and temporarily backs up the need backup partitions of the second flash 148 to the memory 140. The mainboard chip 142 controls the channel conduction between the multiplexer 144 and the first flash 146, and backs up the temporarily backup partitions in the memory 140 to the first flash 146, and clears out the temporarily backup partitions in the memory 140.

In one embodiment, the first flash 146 still stores the BIOS, on the mainboard 10 booting the BIOS detects whether the BMC 110 of the second flash 148 is bad. Furthermore, the BIOS sends an intelligent platform management interface (IPMI) command to the BMC 110, and confirms whether received a response about the IPMI command, the BIOS confirms whether the CRC of the backup table 120 is the same with a CRC calculated by the second flash 148 when the BIOS doesn't receive the response about the IPMI command. The BIOS determines that the partitions of the second flash 148 are bad when the CRC of the backup table 120 is different from the CRC calculated by the second flash 148, and the BIOS repairs the backup partitions of the first flash 146 to the second flash 148, to replace the bad partitions. The CRC is used to check whether received information is different from the information stored in the backup table 120.

Figure 4:
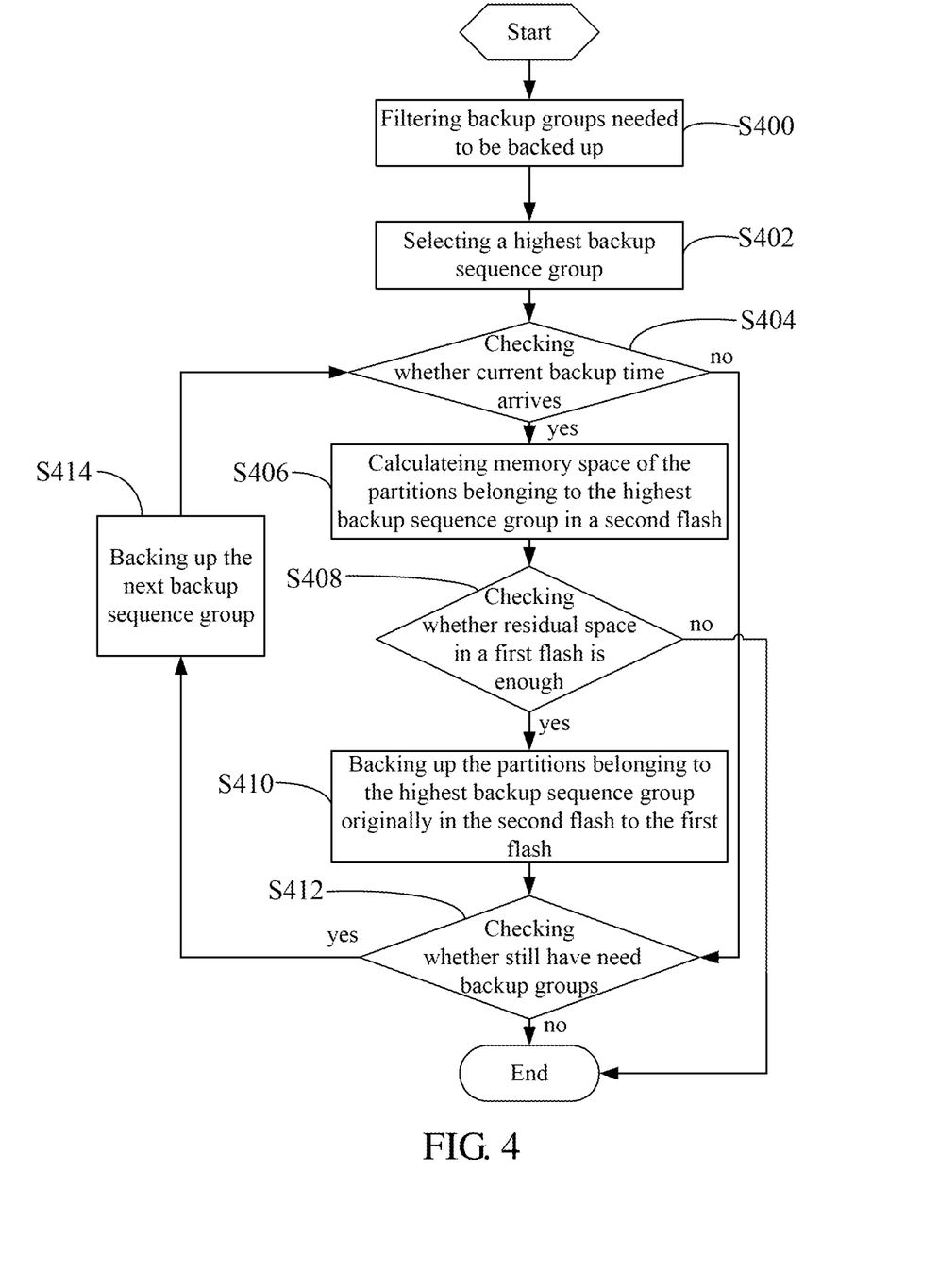
FIG. 4 is a general flowchart of one embodiment of a method of the mainboard backing up a baseboard management controller as disclosed.

FIG. 4 is a general flowchart of one embodiment of a method of the mainboard 10 backing up a baseboard management controller 110 as disclosed, the method is based on those function modules of FIG. 1 or FIG. 3.

In block S400, the selecting module 104 filters backup groups needed to be backed up from the backup table 120 according to the information whether have backed up.

In block S402, the selecting module 104 still selects a highest backup sequence group from the backup table 120 according to the information of the backup sequence.

In block S404, the calculating module 106 checks whether current backup time of partitions belonging to the highest backup sequence group arrives according to the information of the backup cycle and the information of the last backup time. When the current backup time of the partitions belonging to the highest backup sequence group arrives, turn to S406, the calculating module 106 calculates memory space of the partitions belonging to the highest backup sequence group. When the current backup time of the partitions of the highest backup sequence group doesn't arrive, turn to S412, the selecting module 104 checks whether still have backup groups.

In block S408, the backup module 108 checks whether residual space in the first flash 146 is enough according to the calculated memory space. If the residual space in the first flash 146 is enough, turn to S410, the backup module 108 backs up the partitions belonging to the highest backup sequence group originally in the second flash 148 to the first flash 146.

In block S412, the selecting module 104 checks whether still have need backup groups in the backup table 120, and backs up the next backup sequence group if the backup table 120 still have need backup groups.

Figure 5:
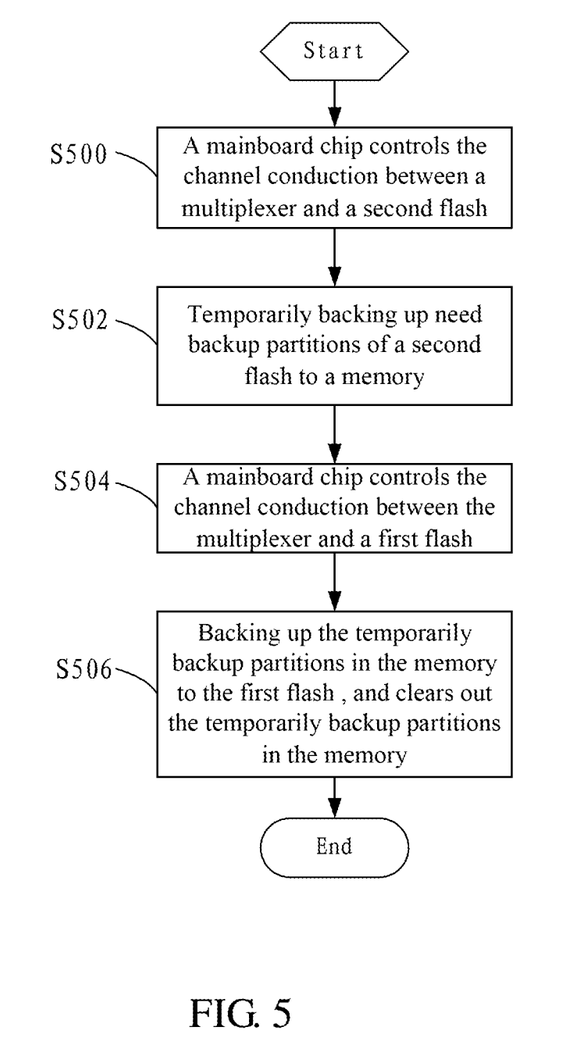
FIG. 5 is a detailed flowchart of one embodiment of a method of using a first flash to back up a second flash of the block S410 of FIG. 4 as disclosed.

FIG. 5 is a detailed flowchart of one embodiment of a method of using the first flash 146 to back up the second flash 148 of the block S410 of FIG. 4 as disclosed, the method is based on those function modules of FIG. 1 or FIG. 3.

In block S500, the mainboard chip 142 controls the channel conduction between the multiplexer 144 and the second flash 148. In block S502, the mainboard chip 142 temporarily backs up need backup partitions of the second flash 148 to the memory 140. In block S504, the mainboard chip 142 controls the channel conduction between the multiplexer 144 and the first flash 146. In block S506, the mainboard chip 142 backs up the temporarily backup partitions in the memory 140 to the first flash 146, and clears out the temporarily backup partitions in the memory 140.

Figure 6:
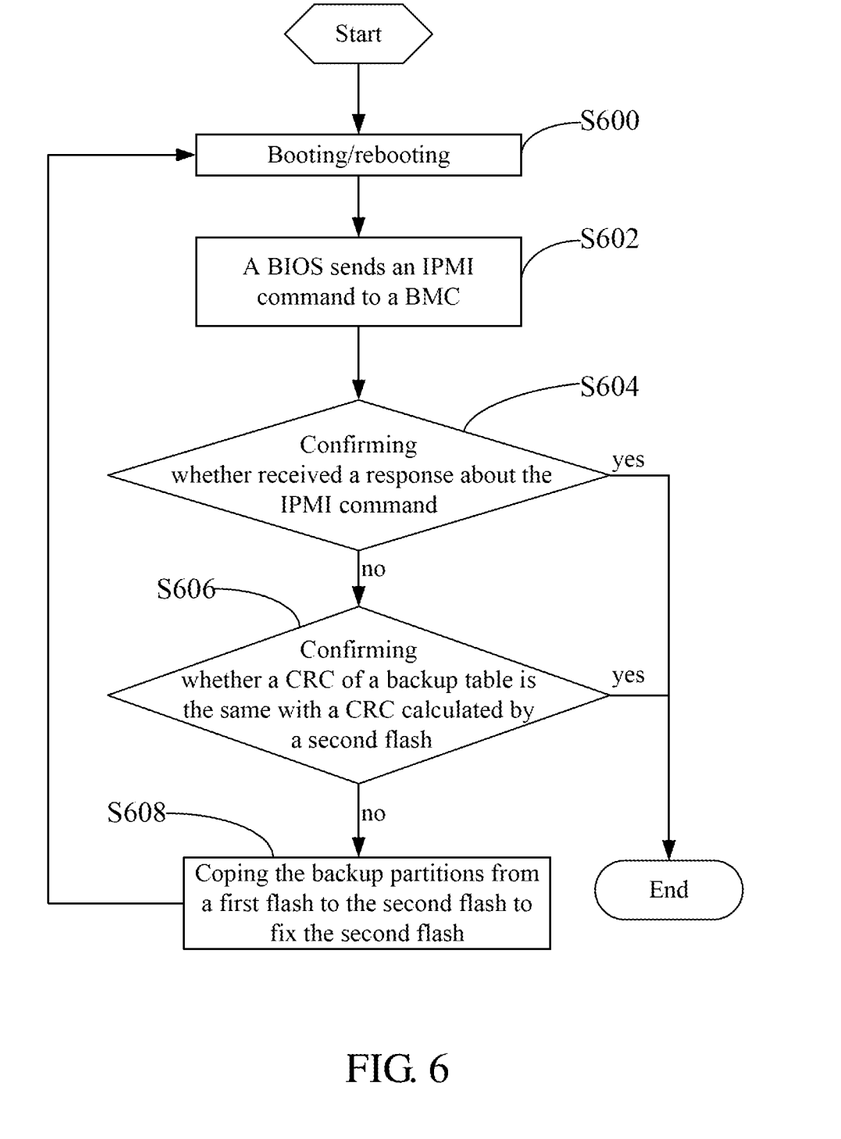
FIG. 6 is a general flowchart of one embodiment of a method of the mainboard performing a repair action when the baseboard management controller is bad as disclosed.

FIG. 6 is a general flowchart of one embodiment of a method of the mainboard 10 performing a repair action when the baseboard management controller 110 is bad as disclosed, the method is based on those function modules of FIG. 1 or FIG. 3.

On the mainboard 10 booting the BIOS detects whether the BMC 110 of the second flash 148 is bad. Further, in block S602, the BIOS sends an intelligent platform management interface (IPMI) command to the BMC 110. In block S604, the BMC 110 confirms whether received a response about the IPMI command. When the BIOS doesn't receive the response about the IPMI command, turn to S606, the BIOS confirms whether the CRC of the backup table 120 is the same with a CRC calculated by the second flash 148. When the CRC of the backup table 120 is different from the CRC calculated by the second flash 148, turn to S608, the BIOS determines that the partitions of the second flash 148 are bad, and the BIOS copies the backup partitions from the first flash 146 to the second flash 148 to fix the second flash 148, to replace the bad partitions.

The mainboard 10 and the backing up the BMC 110 method can fully backup the BMC 110 according to backing up the data of the BMC 110 to the first flash 146. The first flash 146 is a flash of the BIOS or a memory of a physical database or some existing memory of the mainboard 10, the mainboard 10 provide adequate backup space for the second flash 148 according to the existing first flash 148, to backup the BMC 110 completely, and to repair the BMC 110 quickly.

The foregoing disclosure of the various embodiments has been presented for purposes of illustration and description. It is not intended to be exhaustive or to limit the invention to the precise forms disclosed. Many variations and modifications of the embodiments described herein will be apparent to one of ordinary skill in the art in the light of the above disclosure. The scope of the invention is to be defined only by the claims appended hereto and their equivalents.

What is claimed is:

1. A mainboard, comprising:
 a first flash and a second flash, the second flash storing a baseboard management controller (BMC) and a backup table, the BMC comprising a plurality of partitions, the backup table comprising information of the partitions belonging to backup groups, information of whether the partitions have backed up, information of a backup sequence of the partitions belong to one of the backup groups, information of a backup cycle of the partitions, and information of last backup time of the partitions;
 a selecting module filtering backup groups needed to be backed up from the backup table according to the information of whether the partitions have backed up, and selecting a one of the backup groups with the highest backup sequence group from the backup table according to the information of the backup sequence of the partitions;
 a calculating module checking whether current backup time of partitions belonging to the highest backup sequence group arrives according to the information of the backup cycle of the partitions and the information of last backup time of the partitions, and calculating memory space of the partitions belonging to the highest backup sequence group when the current backup time arrives; and
 a backup module checking whether residual space in the first flash is enough according to the calculated memory space, and backing up the partitions belonging to the highest backup sequence group originally in the second flash to the first flash if the residual space in the first flash is enough.

2. The mainboard of claim 1, wherein the selecting module further checks whether still have need backup groups in the backup table, and backs up the next backup sequence group if the backup table still have need backup groups.

3. The mainboard of claim 1, further comprising:
 a memory, a multiplexer, and a mainboard chip, the multiplexer comprising two input ports and an output port, wherein the two input ports of the multiplexer are connected to the first flash and the second flash respectively, the out port of the multiplexer is connected to the memory, the mainboard chip controls the channel conduction between the multiplexer and the second flash temporarily backs up the backup partitions of the second flash to the memory, the mainboard chip controls the channel conduction between the multiplexer and the first flash, backs up the temporarily backup partitions in the memory to the first flash, and clears out the temporarily backup partitions in the memory.

4. The mainboard of claim 3, wherein the mainboard chip performs the function of the selecting module, the calculating module, and the backup module.

5. The mainboard of claim 1, wherein one of the partitions of the BMC is the boot loader, and the backup sequence of the boot loader is first.

6. The mainboard of claim 1, wherein the BMC further comprising a private storage, a kernel, and a file system, the backup sequence of the private storage is second, the backup sequence of the kernel and the file system is third.

7. The mainboard of claim 1, wherein the backup table comprises a BMC address and a backup address, the BMC address is the location of the partitions stored in the second flash, the backup address is the location of the partitions backed up in the first flash.

8. The mainboard of claim 1, wherein the backup table further comprises a cyclic redundancy check (CRC), the first flash still stores a basic input output system (BIOS), the BIOS sends an intelligent platform management interface (IPMI) command to the BMC and confirms whether received a response about the IPMI command, the BIOS confirms whether the CRC of the backup table is the same with a CRC calculated by the second flash when the BIOS doesn't receive the response about the IPMI command, the BIOS determines that the partitions of the second flash are bad when the CRC of the backup table is different from the CRC calculated by the second flash, and the BIOS repairs the backup partitions of the first flash to the second flash, to replace the bad partitions.

9. A mainboard backing up a baseboard management controller (BMC) method, the mainboard comprising a first flash and a second flash, the second flash storing the BMC and a backup table, the BMC comprising a plurality of partitions, the backup table comprising information of the partitions belonging to backup groups, information of whether the partitions have backed up, information of a backup sequence of the partitions belong to one of the backup groups, information of a backup cycle of the partitions, and information of last backup time of the partitions, the mainboard backing up the BMC method comprising:
 filtering backup groups needed to be backed up from the backup table according to the information of whether the partitions have backed up;
 selecting a highest backup sequence group from the backup table according to the information of the backup sequence of the partitions;
 checking whether current backup time of partitions belonging to the highest backup sequence group arrives according to the information of the backup cycle of the partitions and the information of the last backup time of the partitions;
 calculating memory space of the partitions belonging to the highest backup sequence group when the current backup time arrives;
 checking whether residual space in the first flash is enough according to the calculated memory space; and backing up the partitions belonging to the highest backup sequence group originally in the second flash to the first flash if the residual space in the first flash is enough.

10. The mainboard backing up the BMC method of claim 9, further comprising:
checking whether still have need backup groups in the backup table, and backing up the next backup sequence group if the backup table still have need backup groups.

11. The mainboard backing up the BMC method of claim 9, the mainboard further comprising a memory, a multiplexer, and a mainboard chip, the multiplexer comprising two input ports and an output port, wherein the two input ports of the multiplexer are connected to the first flash and the second flash respectively, the out port of the multiplexer is connected to the memory, the backup module backing up the need backup partitions in the second flash to the first flash method further comprising:
the mainboard chip controling the channel conduction between the multiplexer and the second flash, temporarily backing up the backup partitions of the second flash to the memory, the mainboard chip controling the channel conduction between the multiplexer and the first flash, backing up the temporarily backup partitions in the memory to the first flash, and clears out the temporarily backup partitions in the memory.

12. The mainboard backing up the BMC method of claim 9, wherein one of the partitions of the BMC is the boot loader, and the backup sequence of the boot loader is first.

13. The mainboard backing up the BMC method of claim 12, wherein the BMC further comprising a private storage, a kernel, and a file system, the backup sequence of the private storage is second, the backup sequence of the kernel and the file system is third.

14. The mainboard backing up the BMC method of claim 9, wherein the backup table comprises a BMC address and a backup address, the BMC address is the location of the partitions stored in the second flash, the backup address is the location of the partitions backed up in the first flash.

15. The mainboard backing up the BMC method of claim 14, wherein the backup table further comprises a cyclic redundancy check (CRC), the first flash still stores a basic input output system (BIOS), the mainboard backing up the BMC method further comprising: the BIOS sending an intelligent platform management interface (IPMI) command to the BMC, and confirming whether received a response about the IPMI command, the BIOS confirms whether the CRC of the backup table is the same with a CRC calculated by the second flash when the BIOS doesn't receive the response about the IPMI command, the BIOS determining that the partitions of the second flash are bad when the CRC of the backup table is different from the CRC calculated by the second flash, and the BIOS repairing the backup partitions of the first flash to the second flash, to replace the bad partitions.

* * * * *